(No Model.)

R. H. BLACK.
PROCESS OF UNITING SUCKER RODS.

No. 348,823. Patented Sept. 7, 1886.

Witnesses
H. G. Fischer
L. A. Fischer

Inventor
Robert H. Black
By his Attorney

UNITED STATES PATENT OFFICE.

ROBERT HARPER BLACK, OF KENDALL, PENNSYLVANIA.

PROCESS OF UNITING SUCKER-RODS.

SPECIFICATION forming part of Letters Patent No. 348,823, dated September 7, 1886.

Application filed October 17, 1885. Serial No. 180,180. (No model.)

*To all whom it may concern:*

Be it known that I, ROBERT HARPER BLACK, of Kendall, in the county of McKean and State of Pennsylvania, have invented a new and useful Improvement in Processes of Uniting Sucker-Rods, of which the following is a specification.

Heretofore uniting of sucker-rods has been accomplished by simply placing the flattened portion of the stub-joint over the flattened portion of the rod and in connection with the usual composition, making the weld in that manner. The defect, however, of this method is that seams or angular cracks are sometimes formed in the sides of the rod, and thus the whole be more or less defective.

The object of my invention is to provide a method for welding that overcomes this defect, all as will now be more fully set out and explained, reference being had to the accompanying drawings, in which—

Figure 1:
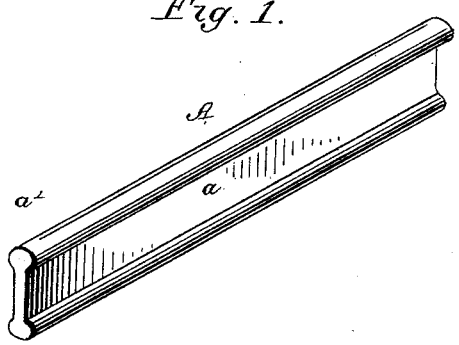
Figure 3:
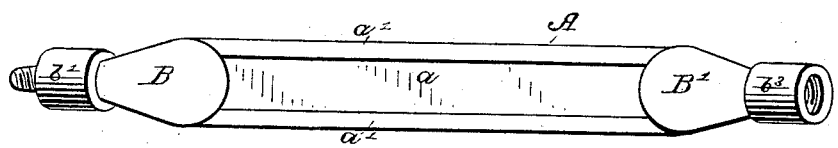
Figure 2:
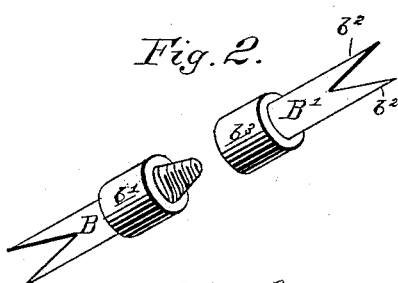
Figure 4:
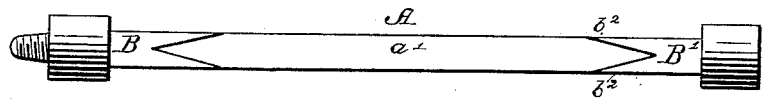

Figure 1 is a perspective view of the rod or bar; Fig. 2, perspective view of the male and female coupling-pieces. Fig. 3 is a top plan of one section of the rod, having fixed on its ends, respectively, a male and female coupling piece or joint. Fig. 4 is a side view of the device as shown in Fig. 3.

To carry out this process the rod or bar is made of sections A, with a thin web, $a$, and a thickened edge or bead, $a'$, on each side. Each section A is made of any desired length for the purpose of the present use. One end is then fitted into the forks $b$ of the male coupling-piece or the forks $b^2$ of the female coupling-piece, and then joined securely thereto. To the opposite end of the bar the other part of the joint or coupling is fixed in like manner, and the rod thus made can be lengthened at will by joining to this section another section formed in like manner and provided with joints. It is obvious that in this process the section A may have the thickened edges or beads integral therewith or joined on in any well-known way. By this process a perfectly firm and secure weld can be made between the end of the rod or bar and its portion of the joint attached to it. In such devices as this it is of the utmost importance, for if the weld breaks or pulls apart the rod is spoiled.

A sucker-rod made by this process can be twisted either right or left handed, as desired. It can be twisted right-handed with the threads of the joint running in the same direction with the twist, or twisted left-handed with the threads of the joint in transverse way of the twist. In rods made by any other process that I am acquainted with, if twisted right-handed with the threads of the joint running in the same direction, the rods, when in the tubing of a well, oil or Artesian, will unscrew apart because of the friction of the fluid. A rod made by my process offers no opportunity for friction, and so will not unscrew.

Having now described my invention, what I desire to secure by Letters Patent is—

1. The process above set forth of making sucker-rods, consisting in preparing a section of metallic rod with thickened edges, and securing on the respective ends of said rod a male and female joint by placing one end of said rod in the fork of its joint and the other end in the fork of its joint, and then securing the ends of the forks upon the body of the rod by welding, all substantially as described.

2. A process for uniting sucker-rods, which consists in splitting the one end of the stud-joint or coupling, and then inserting therein the web of the rod and welding the joint to the sides of the bar, and afterward welding the ribs on the side of the bar to the stub-joint, substantially as and for the purpose as herein set forth and described.

In testimony that I claim the foregoing I have hereunto set my hand, this 15th day of August, 1885, in the presence of witnesses.

ROBERT HARPER BLACK.

Witnesses:
 T. M. WILSON,
 H. H. NORTH.